US010027592B1

(12) United States Patent
Guo et al.

(10) Patent No.: US 10,027,592 B1
(45) Date of Patent: Jul. 17, 2018

(54) SYSTEM TO FACILITATE DATA TRANSFER IN WIRELESS NETWORKS

(71) Applicant: AMAZON TECHNOLOGIES, INC., Seattle, WA (US)

(72) Inventors: Jin Guo, Cupertino, CA (US); Shengwei Zhang, Fremont, CA (US); Qingyun Wei, San Jose, CA (US); King Shaw, Saratoga, CA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 71 days.

(21) Appl. No.: 15/143,130

(22) Filed: Apr. 29, 2016

(51) Int. Cl.
*H04L 12/841* (2013.01)
*H04L 29/12* (2006.01)
*H04L 12/26* (2006.01)
*H04L 12/801* (2013.01)

(52) U.S. Cl.
CPC .......... *H04L 47/28* (2013.01); *H04L 43/0882* (2013.01); *H04L 43/16* (2013.01); *H04L 47/11* (2013.01); *H04L 61/6022* (2013.01)

(58) Field of Classification Search
CPC ..... H04L 43/0882; H04L 43/16; H04L 43/11; H04L 47/28; H04L 61/6022
USPC ....................................................... 370/232
See application file for complete search history.

(56) References Cited

U.S. PATENT DOCUMENTS

| 7,808,908 | B1* | 10/2010 | Bharghavan | .......... | H04L 1/0002 370/229 |
| 2006/0209771 | A1* | 9/2006 | Shpak | ............... | H04W 74/0816 370/338 |
| 2007/0104129 | A1* | 5/2007 | Yang | ..................... | H04L 1/0003 370/329 |
| 2010/0157886 | A1* | 6/2010 | Jia | ........................ | H04B 1/7075 370/328 |
| 2013/0042031 | A1* | 2/2013 | Jeon | ...................... | H04W 48/16 710/36 |

OTHER PUBLICATIONS

Cisco "Connected Mobile Experience" 802.11 Fundamentals: Chapter 12. Sep. 4, 2014.*

* cited by examiner

*Primary Examiner* — Stephen J Clawson
(74) *Attorney, Agent, or Firm* — Lindauer Law, PLLC (57) ABSTRACT

A group of computing devices use a wireless channel for communication, resulting in congestion. Within that group, some devices may need to exchange time sensitive application data, such as data indicative of control inputs received from a user. A destination device may transmit a clear to send (CTS) frame over the channel that indicates a CTS interval indicative of a time to suspend transmission. Other computing devices respond to the CTS frame by suspending transmission for the specified CTS interval. However, a source device in the group of many computing devices receives the CTS frame and initiates transmission of application data instead of suspending transmission. As a result, the source device transmits while other computing devices are not transmitting. In some implementations a beacon frame may be transmitted before a CTS frame. The destination device may confirm receipt of the application data by transmitting an acknowledgement to the source device.

20 Claims, 8 Drawing Sheets

SYSTEM TO FACILITATE DATA TRANSFER IN WIRELESS NETWORKS

BACKGROUND

Wireless network interfaces allow a variety of computing devices to communicate with one another. These computing devices may include tablet computers, remote controls, set-top-boxes, access points, vehicles, and so forth. However, increased numbers of computing devices and their corresponding use of wireless networks may result in congestion, impairing the timely delivery of data using the wireless network.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described herein by way of example, those skilled in the art will recognize that the implementations are not limited to the examples or figures described. It should be understood that the figures and detailed descriptions thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A wireless network interface allows one computing device to communicate with one or more other computing devices to form a wireless network. The wireless network interface may use one or more wireless networking technologies, such as Wi-Fi, Bluetooth, Bluetooth Low Energy (BLE), ZigBee, and so forth. These computing devices may include tablet computers, remote controls, set-top-boxes (STB), televisions, access points, sensors, home automation devices, security systems, game console, embedded devices, and so forth.

The wireless network interface includes a radio with a receiver that detects a radio frequency (RF) wireless signal. The wireless signal may be transmitted at one or more frequencies. In some situations, a particular frequency or group of frequencies may be referred to as a "channel".

During operation of the wireless network computing devices have data that is queued up for transmission to another computing device. For example, a source device generates and transmits application data to a destination device that uses the application data. Continuing the example, the source device may be a remote control, the application data may comprise data indicative of user input, and the destination device may be a television, STB, game console, and so forth.

Transmission of data on the wireless network may be impaired due to congestion on the channel. For example, a heavily congested channel may be one in which the utilization of the channel exceeds a threshold percentage of time. Congestion may occur for many reasons. For example, many of the computing devices may have data to transmit at about the same time, retransmissions may take place due to collisions, and so forth.

As congestion increases, the amount of time available on the channel to transmit data may decrease or may occur at times that do not allow for desired timeliness for the transfer of data. For example, so many of the different computing devices may be attempting to transfer data using the channel that there is not an opportunity for the wireless network interface to transmit the data. In another example, the channel may be busy now but will be available for use in 3000 ms (milliseconds), while the source needs to deliver the data to the destination within 50 ms to maintain a predetermined level of performance. Regardless of the cause or nature of the congestion, delayed delivery of some data may be undesirable.

Described are techniques to facilitate data transfer in the wireless network. Source devices and destination devices may be configured using the techniques described in this disclosure to provide opportunities for the transmission of data. This data may be deemed time sensitive, such as in the case of data transferring information indicative of user inputs to a remote control, user inputs to a home automation control system, and so forth.

A source device and a destination device may be paired with one another. The pairing process may include transmission of information from one device to another, or an exchange of information between the two. For example, the destination device may receive information such as a media access control (MAC) address of the source device. Continuing the example, the source device may receive information such as a MAC address of the destination device. For example, a remote control may be associated with particular set-top box, with each receiving the MAC address of the other.

During operation, the source device may occasionally generate application data. For example, the application data may comprise information indicative of a user input, such as a key press on a remote control. The application data may be scheduled or queued for transmission to the destination device. Continuing the example, the application data may be sent to a television, game console, home automation control system, and so forth.

The destination system may transmit beacon frames. In some implementations, beacon frames may be transmitted on a regular interval, such as every 100 ms. The beacon frame may be compliant with at least a portion of the IEEE 802.11 wireless networking standard as promulgated by the Institute of Electrical and Electronics Engineers (IEEE).

A clear to send (CTS) frame may then be transmitted. The CTS frame may be compliant with at least a portion of the IEEE 802.11 wireless networking standard as promulgated by the IEEE. Unlike other protocols, in the implementation described in this disclosure, no request to send (RTS) frame is transmitted to elicit the CTS frame. Instead, the destination device sends the CTS frame of its own accord. The CTS frame is thus transmitted without responding to an RTS frame. In the IEEE 802.11 implementation, the CTS frame may include data in four fields: frame control, CTS duration, receiver address (RA), and a frame check sequence (FCS). The frame control comprises information to facilitate data transmission, the CTS duration indicates a period of time, the RA indicates a MAC address of a wireless network interface that is to receive the frame, and the FCS is used for error correction. In some implementations the CTS duration may comprise a value indicative of microseconds.

Following the transmission of a beacon frame, the destination device sends a CTS frame including the CTS duration. Computing devices other than the source device process the CTS frame and stop transmitting for an interval specified by the CTS duration. The suspension of transmission provides a "quiet period". During this "quiet period" the source device transmits data to the destination device. When the "quiet period" concludes, the various computing devices may resume communication on the wireless network.

The source device may be configured such that transmission is responsive to the receipt of the beacon frame and the CTS frame. The source device may be configured to disregard a CTS frame based on the originating address of the CTS frame. For example, the source device may transmit application data during the "quiet period" and responsive to receipt of the CTS frame from the destination device with which it is paired. Continuing the example, should a different destination device that is not paired with the source device transmit a CTS frame, the source device would be that CTS frame and refrain from transmitting during the interval specified by the CTS duration.

After receipt of the transmitted data, the destination device may respond to the source with an acknowledgment. In some implementations, the acknowledgment may be generated using instructions and dedicated hardware that are part of the wireless network interface. For example, the physical layer hardware of the wireless network interface may be configured to respond to a frame carrying payload with an acknowledgment frame. With this implementation, the acknowledgment to the source device is indicative of the receipt of the transmitted data over the wireless network, and not necessarily that the information in the transmitted data has been processed or otherwise acted upon at a higher layer, such as by an application module executing on a processor of the computing device.

To obtain a desired level of performance, in some situations the transmitted data may need to be sent more frequently. For example, application data the change the setting on the thermostat in the home may be deemed timely delivered if transmitted within 100 ms. In another example, application data such as key inputs made to a game controller during gameplay may be deemed timely delivered if transmitted within 33 ms. For the purposes of gameplay, a latency of 100 ms may result in a negative user experience, inability to properly control the game, and so forth. In some implementations latency may be measured as elapsed time from user input to reception by the computing device that will ultimately process that user input to affect gameplay. For example, latency may be measured as the time from the user pressing a button until the game application executing on a game console processes that user input.

A CTS frequency may be specified that indicates how often the CTS frame is transmitted onto the wireless network. In some implementations, the CTS frequency may correspond with the beacon interval indicating how often beacon frames are transmitted. For example, a beacon frame may be transmitted every 100 ms, and a CTS frame may be transmitted thereafter, also at 100 ms intervals between successive CTS frames. However as described above, in some situations lower latency may be desired. In these situations, the beacon interval may remain unchanged, while the CTS frequency is increased. Continuing the earlier example, the beacon frame may continue to be transmitted every 100 ms, while CTS frames may be transmitted every 33.33 ms. If the source device has application data to send, the source device may then transmit the application data that is queued up for transmission during the "quiet period" resulting from the transmission of the latest CTS frame.

A time delay value may specify an interval of time that is to elapse before another CTS frame is transmitted. The elapsed time may be measured relative to an event, such as transmission of the acknowledgment by the destination device. In some implementations, the application data provided by the source device may not necessarily be periodic in when it is queued for transmit. For example, during gameplay there may be times when the user is making no inputs and thus there is no application data to be queued for transmit, while at other times the user may be making many inputs. In one implementation, the time delay value may be determined based on an estimated time until the next set of application data is ready for transmit. For example, timestamp data from previously received application data may be analyzed to determine an estimated time that the next application data will be queued up and ready for transmit. Based on this estimation, the time delay value may be specified such that a CTS frame is transmitted and the corresponding "quiet period" occurs at a time when the next application data is ready to be transmitted. In this way, latency in the delivery of the application data may be further reduced.

The time delay value may be used instead of or in conjunction with the CTS frequency. For example, the CTS frequency may be set to transmit a CTS frame every 100 ms, while a time delay value may indicate that application data is estimated to be ready for transmit by the source device 70 ms from now. The CTS frames may continue to be sent every 100 ms, but an additional CTS frame may be transmitted at the 70 ms time.

The system may be responsive to the conditions of the wireless network, type of data being transmitted, and so forth. One or more parameters such as the CTS duration, CTS frequency, time delay values for transmitting CTS frames, and so forth may be determined at least in part on one or more of information about an application in use, network metric data, and so forth.

Information about an application module that is in use or application data may be used to adjust the parameters of the system. For example, an application module such as a game may execute on the destination device. This application module may have a designated service level that provides an acceptable user experience when the application data indicative of user inputs from a source device such as a game controller are transmitted within 33.33 ms of being queued for transmission. Based on this information about the application data or the application module, the destination device may have a CTS frequency set to transmit the CTS frames every 33.33 ms. Different application modules may have different service levels and correspondingly different CTS frequencies.

The wireless network interfaces, application modules, and so forth may generate network metric data. The network metric data comprises information indicative of operation of the wireless network interface, channel conditions, operation of other devices on the wireless network, and so forth. For example, clear channel assessment (CCA) data may be obtained from a wireless network interface over a span of several seconds. The CCA data provides information about activity on the channel, such as whether a carrier has been sensed, energy detection such as other transmissions or noise on the channel, and so forth. In some implementations, network metric data may be received from another device, such as an access point. One or more of the parameters of the system may be determined based at least in part on the network metric data. For example, when the network metric data indicates that the wireless network is below a threshold level of congestion, the CTS duration may be set to a zero value. In another example, when the network metric data indicates that the wireless network is above a threshold level of congestion, the CTS frequency and the CTS duration may be set to predetermined maximum values to avoid adversely impacting the operation of the wireless network.

A single source device and a destination device are described in this disclosure for ease of discussion and not necessarily as a limitation. These techniques may be extended to include multiple source devices and multiple destination devices. For example, a destination device such as a game console may use the wireless network to receive application data from many remote control devices.

While the wireless network interfaces are described as using radio frequency signals, in other implementations the techniques herein may be applied to other types of signals. For example, the wireless network interface may send and receive optical, acoustic, magnetic, or other signals.

By using the CTS frame transmitted by the destination device, the particular scheduling of the CTS frame transmission, and having the source device be response to one or more of the beacon frame or the CTS frame, the system allows for timely transmission in a congested network environment. For example, application data indicative of user inputs made to a remote control may be timely delivered to a set-top box or television, resulting in a positive user experience.

Illustrative System

Figure 1:
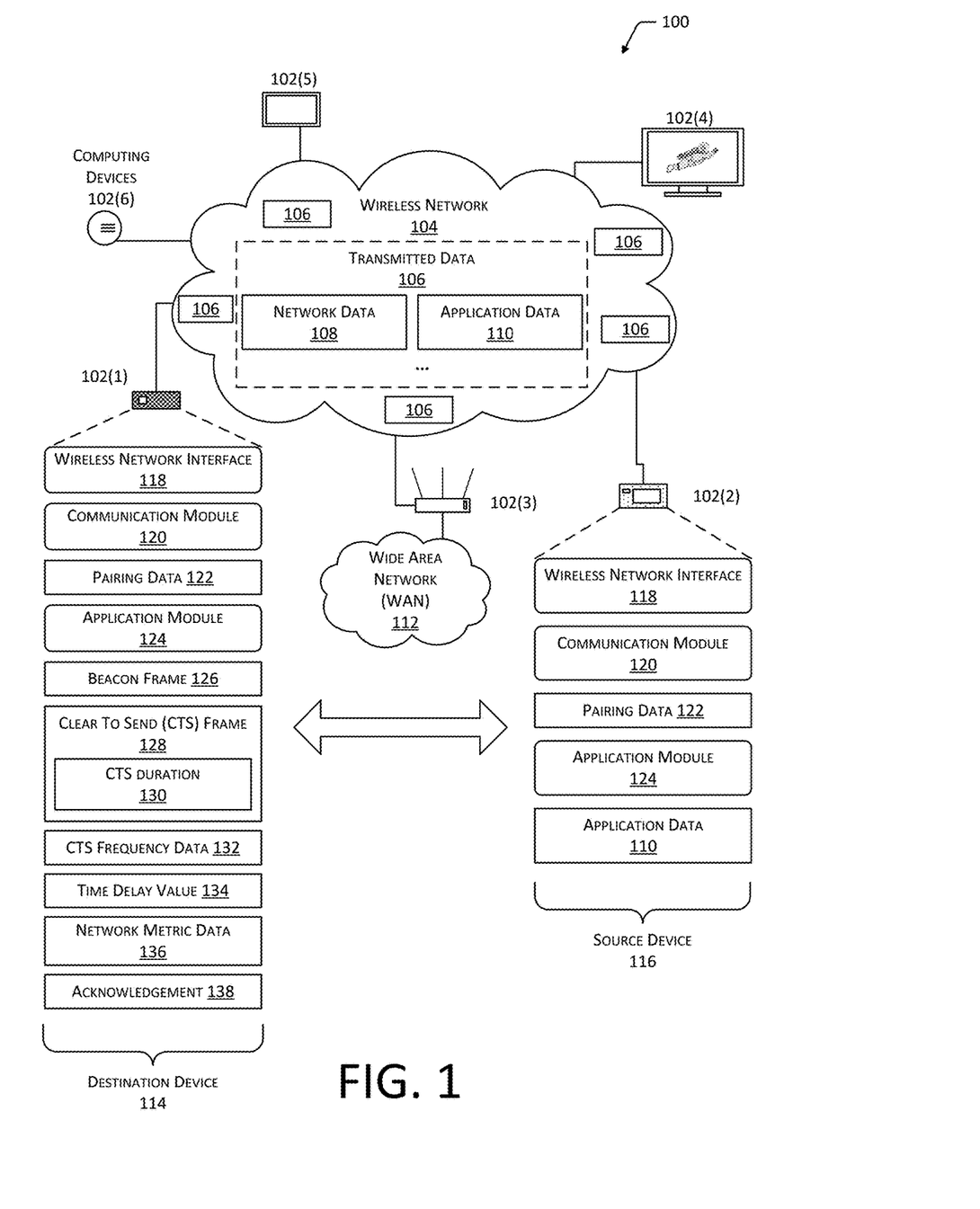
FIG. 1 is an illustrative system for facilitating data transfer from a source device to a destination device in a wireless network, according to one implementation.

FIG. 1 is an illustrative system 100 for facilitating data transfer from a source device to a destination device in a wireless network, according to one implementation. An environment may have a plurality of computing devices 102. These computing devices 102 may include tablet computers, remote controls, set-top-boxes (STB), television, access points, sensors, home automation devices, appliances, embedded devices, security systems, and so forth. For example, a computing device 102(1) may comprise a STB, a computing device 102(2) may comprise a remote control, a computing device 102(3) may comprise an access point, a computing device 102(4) may comprise a television, a computing device 102(5) may comprise a tablet, a computing device 102(6) may comprise a thermostat, and so forth. The environment may include any number of computing devices 102.

The computing devices 102 may access a wireless network 104 to send transmitted data 106 from one computing device 102 to another. Transmitted data 106 may include, but is not limited to network data 108, application data 110, and so forth. The network data 108 may comprise information associated with the operation or management of the wireless network 104. For example, the network data 108 may include management frames transmitted between the computing devices 102. The application data 110 comprises information that is generated by or sent to an application module. For example, the application data 110 may comprise information indicative of a user input, audio, video, and so forth.

Wireless network 104 may connect to one or more other networks. For example, the wireless network 104 for may connect to a wide area network (WAN) 112. The WAN 112 may comprise the internet, a private network, and so forth.

Some of the computing devices 102 may be destination devices 114 while others may be source devices 116. The source device 116 may transmit application data 110, while the destination device 114 receives the application data 110. In some implementations, the source device 116 may generate the application data 110 and the destination device 114 may consume the application data 110.

The wireless network interface 118 may comprise one or more components such as radio receivers, radio transmitters, digital signal processors, field programmable gate arrays, processors, microcontrollers, memory, and so forth. The wireless network interface 118 may include devices compatible with at least a portion of one or more protocols such as Wi-Fi, Bluetooth, ZigBee, 2G, 3G, 4G, LTE, and so forth. Wireless network interface 118 may utilize signals that are transmitted and received at a particular frequency or group of frequencies designated as a "channel".

In some implementations, the wireless network 104 may contemporaneously utilize a plurality of different protocols. For example, the wireless network 104 may include a Wi-Fi and Bluetooth network sharing at least some radio spectrum, such as a common channel or portion thereof.

The communication module 120 may be configured to establish connections with one or more of the other computing devices 102 by using the wireless network interface 118 to access the wireless network 104. The communications may be authenticated, encrypted, and so forth.

Pairing data 122 may be generated during configuration of the destination device 114 and the source device 116. For example, during set up of the set-top box, a remote control device may be associated with the set-top box. The pairing data 122 may include one or more of media access control (MAC) addresses, network addresses, universally unique identifiers (UUIDs), cryptographic credentials, supported communication protocols, information indicative of a type of device, information indicative of an application, type of application, and so forth. Continuing the example, during set up of the set-top box, the set-top box acting as a destination device 114 may exchange information with the remote control acting as the source device 116 to generate the pairing data 122. The pairing data 122 may include MAC addresses as well as data indicating that the destination device 114 is set-top box and that the source device 116 is a remote control.

The computing device 102 may execute an application module 124. The application module 124 may be configured to perform one or more functions when executed by the computing device 102. For example, the application module 124 may be configured to generate a video stream for output on a television, control home automation system, control and appliance, and so forth. During operation, the application module 124 may send or receive application data 110. For example, the application module 124 of the source device 116 may generate application data 110. This application data 110 may be transmitted by the source device 116 to the destination device 114. The application module 124 of the destination device 114 may process this application data 110 and perform one or more other functions, such as storing the application data 110, using the application data 110 during further processing, and so forth.

In some implementations, the wireless network interface 118, or the communication module 120, may generate and transmit network data 108. The network data 108 may include, but is not limited to, beacon frames 126, clear to send (CTS) frames 128, and so forth.

The beacon frame 126 comprises information that identifies a particular computing device 102. For example, the beacon frame 126 transmitted by the destination device 114 may include a MAC address of the wireless network interface 118 of the destination device 114. The beacon frame 126 may be transmitted at a predefined beacon interval specified by a beacon rate data. For example, the predefined beacon interval may be 100 ms in the beacon frame 126 may be transmitted by the wireless network interface 118 onto the wireless network 104 every 100 ms. In the IEEE 802.11 implementation, the beacon frame 126 may include one or more of data indicative of a timestamp, data indicative of a first media access control (MAC) address associated with the wireless network interface 118, data indicative of a service set identification (SSID), or other data.

The CTS frame 128 may be compliant with at least a portion of the IEEE 802.11 wireless networking standard as promulgated by the Institute of Electrical and Electronics Engineers (IEEE). In the IEEE 802.11 implementation, the CTS frame 128 may include data in four fields: frame control, CTS duration 130, receiver address (RA), and a frame check sequence (FCS). The frame control comprises information to facilitate data transmission, the RA indicates a MAC address of a wireless network interface 118 that is to receive the frame, and the FCS is used for error correction. The RA field of the CTS frame 128 may specify a broadcast address, a multicast address, a unicast address, and so forth. The broadcast address may indicate that the frame may be processed by any wireless network interface 118 on the wireless network 104. The multicast address may indicate particular wireless network interfaces 118, such as a designated group of computing devices 102. The unicast address indicates a single particular wireless network interface 118. By using a particular address, the CTS frame 128 may be directed to one or more of the computing devices 102 on the wireless network 104.

The CTS duration 130 is indicative of an interval of time. Upon receipt of the CTS frame 128, a wireless network interface 118 may temporarily suspend transmission for period of time based on the CTS duration 130. In some implementations the CTS duration 130 may comprise a value that is indicative of a number of microseconds. In other implementations, the CTS duration 130 may indicate other units of time, such as nanoseconds, milliseconds, seconds, and so forth.

The computing devices 102 may also utilize CTS frequency data 132. The CTS frequency data 132 specifies an interval at which subsequent CTS frames 128 may be transmitted. In one implementation, the CTS frequency data 132 may indicate a value indicative of a unit of time. For example, the CTS frequency data 132 may indicate that CTS frames 128 will be transmitted every 100 ms, or at a frequency of 10 times per second. In another implementation, the CTS frequency data 132 may be expressed as a fractional value of another interval value. For example, CTS frequency data 132 may indicate that CTS frame 128 is to be transmitted at an interval that is one third that of the beacon rate.

The computing device 102 may also store a time delay value 134. The time delay value 134 specifies a maximum amount of elapsed time relative to a designated occurrence at which a CTS frame 128 is to be sent. For example, the time delay value 134 may specify that a CTS frame 128 is to be transmitted 70 ms after the transmission of an acknowledgment by the destination device 114 of previously received application data 110. The time delay value 134 may be used instead of or in conjunction with the CTS frequency data 132. Continuing the example above with regard to the CTS frequency data 132, the time delay value 134 of 70 ms may result in an additional CTS frame 128 to be transmitted along with those sent every 33.33 ms.

The wireless network interfaces 118, the communication modules 120, the application modules 124, and so forth may generate network metric data 136. The network metric data 136 comprises information indicative of operation of the wireless network interface 118, channel conditions, operation of other devices on the wireless network 104, and so forth. For example, clear channel assessment (CCA) data may be obtained from a wireless network interface 118 over a span of several seconds. The CCA data provides information about activity on the channel, such as whether a carrier has been sensed, energy detection such as other transmissions or noise on the channel, and so forth. In some implementations, network metric data 136 may be received from another computing device 102, such as the access point.

One or more of the parameters of the system 100, such as the beacon interval, CTS duration 130, CTS frequency data 132, time delay value 134, and so forth may be determined based on one or more of the application module 124, type of application, application data 110, and so forth. The CTS duration 130 may vary based at least in part on the type of application data 110 being transferred. For example, the application module 124 may comprise an interactive video game that uses the application data 110 produced by a remote control as input. A lookup table or other data structure may be used to determine one or more of a desired CTS duration 130 or CTS frequency data 132 associated with that application module 124. Continuing the example, the lookup table may indicate that for the application module 124 a CTS duration 130 of 33.33 ms is deemed to be sufficient to allow for the transfer of the application data 110 and that the corresponding CTS frequency data 132 may indicate CTS frames 128 should be transmitted every 50 ms.

One or more of the parameters of the system 100, such as the beacon interval, CTS duration 130, CTS frequency data 132, time delay value 134, and so forth may be determined based at least in part on the network metric data 136. For example, the network metric data 136 may indicate that the wireless network 104 is below a threshold level of congestion, indicating that the wireless network 104 is uncongested. In this condition, the CTS duration 130 may be set to a zero value. This allows for the use of the CTS frame 128 in the process described herein, as well as allowing the CTS frame 128 to be used for time alignment purposes between devices on the wireless network 104. In another example, where the network metric data 136 indicates that the wireless network 104 is above a threshold level of congestion, the CTS duration 130 and the CTS frequency data 132 may be set to predetermined maximum values to avoid adversely impacting the operation of the wireless network 104. Continuing the example, the CTS duration 130 may be set to a maximum of 40 ms and the CTS frequency data 132 may indicate that CTS frames 128 will be transmitted at intervals of 70 ms. The adjustment of the parameters may be dynamic based on changing values of the network metric data 136. For example, the CTS durations 130 for consecutive CTS frames 128 may be increased or decreased over time responsive to one or more values of the network metric data 136.

During operation of the system, such as described below, the destination device 114 may transmit one or more CTS frames 128. Other computing devices 102 may receive and process the CTS frame 128. Responsive to the CTS frame 128, these other computing devices 102 may refrain from or otherwise suspend transmission of transmitted data 106 on the wireless network 104 for period of time corresponding to that of the CTS duration 130. The source device 116, however, uses the "quiet period" produced by the CTS frame 128 to transmit the application data 110 that it has queued up for transmission. Once the period of time specified by the CTS duration 130 ends, the device on the wireless network 104 for may resume transmission.

As described above, the pairing data 122 provides information to facilitate coordination between the destination device 114 and the source device 116. For example, based on the pairing data 122, the source device 116 has the MAC address of the wireless network interface 118 of the destination device 114.

During operation, the destination device 114 may transmit an acknowledgment 138 to the source device 116. For example, after receiving application data 110 that was transmitted by the source device 116, the destination device 114 may transmit an acknowledgment 138. In some implementations, the acknowledgment 138 may be generated at least in part by the hardware of the wireless network interface 118. For example, the processor that is part of the wireless network interface 118 may detect the receipt of the application data 110, generate acknowledgment 138 frame, and send the acknowledgment 138 to the source device 116 using the wireless network 104. With this implementation, the acknowledgment 138 is provided with a very low latency and without being delayed by situations such as the application module 124 processing other information before the application data 110.

Illustrative Processes

Figure 2:
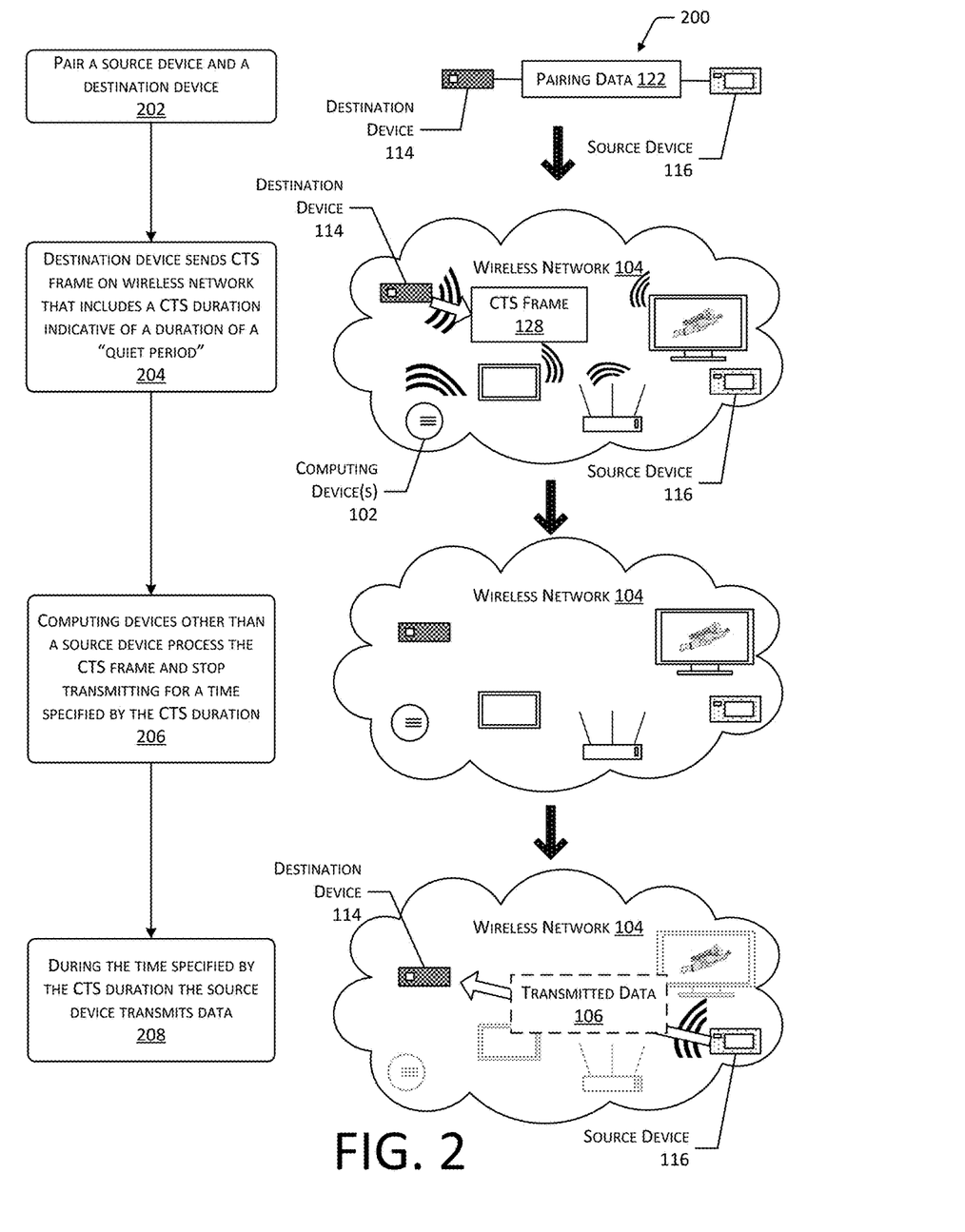
FIG. 2 illustrates a flow diagram of a process of a destination device sending a clear to send (CTS) frame to provide a clear time for a source device to send data to the destination device, according to one implementation.

FIG. 2 illustrates a flow diagram 200 of a process of a destination device 114 sending a clear to send (CTS) frame 128 to provide a clear time for a source device 116 to send data to the destination device 114, according to one implementation.

At 202, the source device 116 and the destination device 114 may be paired with one another. In one implementation, the pairing may involve each computing device 102 transmitting information such as a MAC address, type of device, cryptographic credentials, and so forth. In other implementations, pairing data 122 may be obtained during operation of the system 100. For example, the destination device 114 and the source device 116 may not be previously paired with one another. The destination device 114 may broadcast one or more of the beacon frames 126 or CTS frames 128. After processing the CTS frame 128, the source device 116 may then respond by sending one or more of pairing data 122, application data 110, and so forth.

At 204, the destination device 114 sends a CTS frame 128. As described above, the CTS frame 128 includes a CTS duration 130. Unlike conventional systems, no request to send (RTS) frame is sent to elicit the CTS frame 128. The CTS duration 130 indicates a duration of period of time during which wireless network interfaces 118 that respect to the CTS frame 128 will suspend transmission. In other words, a wireless network interface 118 that hears a CTS frame 128 may honor a "quiet period" and refrain from transmitting during that time. A device may be deemed to honor a frame such as the CTS frame 128 when it performs a specific action or function responsive to that frame. For example, a wireless network interface 118 that suspends transmission responsive to a CTS frame 128 is deemed to honor that CTS frame 128.

At 206, the computing devices 102 other than the source device 116 process the CTS frame 128 and honor that CTS frame 128 by suspending their transmission for the time specified by the CTS duration 130. At this time, the wireless network 104 may exhibit a very low level of activity as the various wireless network interfaces 118 attached to computing devices 102 are silent.

At 208, during the time specified by the CTS duration 130, the source device 116 transmits the application data 110. In effect, the source device 116 does not honor the CTS frame 128 by suspending transmission. In some implementations, receipt of the CTS frame 128 may trigger the transmission of the application data 110. In other implementations, a combination of receipt of the CTS frame 128 and other data such as a beacon frame 126 may be used to trigger the transmission of the application data 110.

The source device 116 may use information such as the pairing data 122 to determine which CTS frames 128 are associated with the transmission of application data 110. For example, a first CTS frame 128 sent from a MAC address of the destination device 114 that is stored in the pairing data 122 may be used to trigger transmission. In comparison, a second CTS frame 128 sent from a different MAC address may be honored and result in the source device 116 suspending transmission during the CTS duration 130 specified in that second CTS frame 128.

In some implementations, the source device 116 may limit transmission during the CTS duration 130 to a particular application module 124, type of application module 124, process, and so forth. For example, during the CTS duration 130, the application data 110 indicative of user input may be transmitted, while other information such as routine log files may be deferred for transmittal at another time outside of the "quiet period".

By using the CTS frame 128 in this way, the destination device 114 is able to provide an opportunity for the source device 116 to send its application data 110, if any. By using the techniques described below to set the parameters of the system, such as the CTS duration 130, CTS frequency data 132, the time delay value 134, and so forth, data transfer is facilitated in a timely fashion with minimal overhead and in a way that is compatible with many wireless network interfaces 118.

Figure 3:
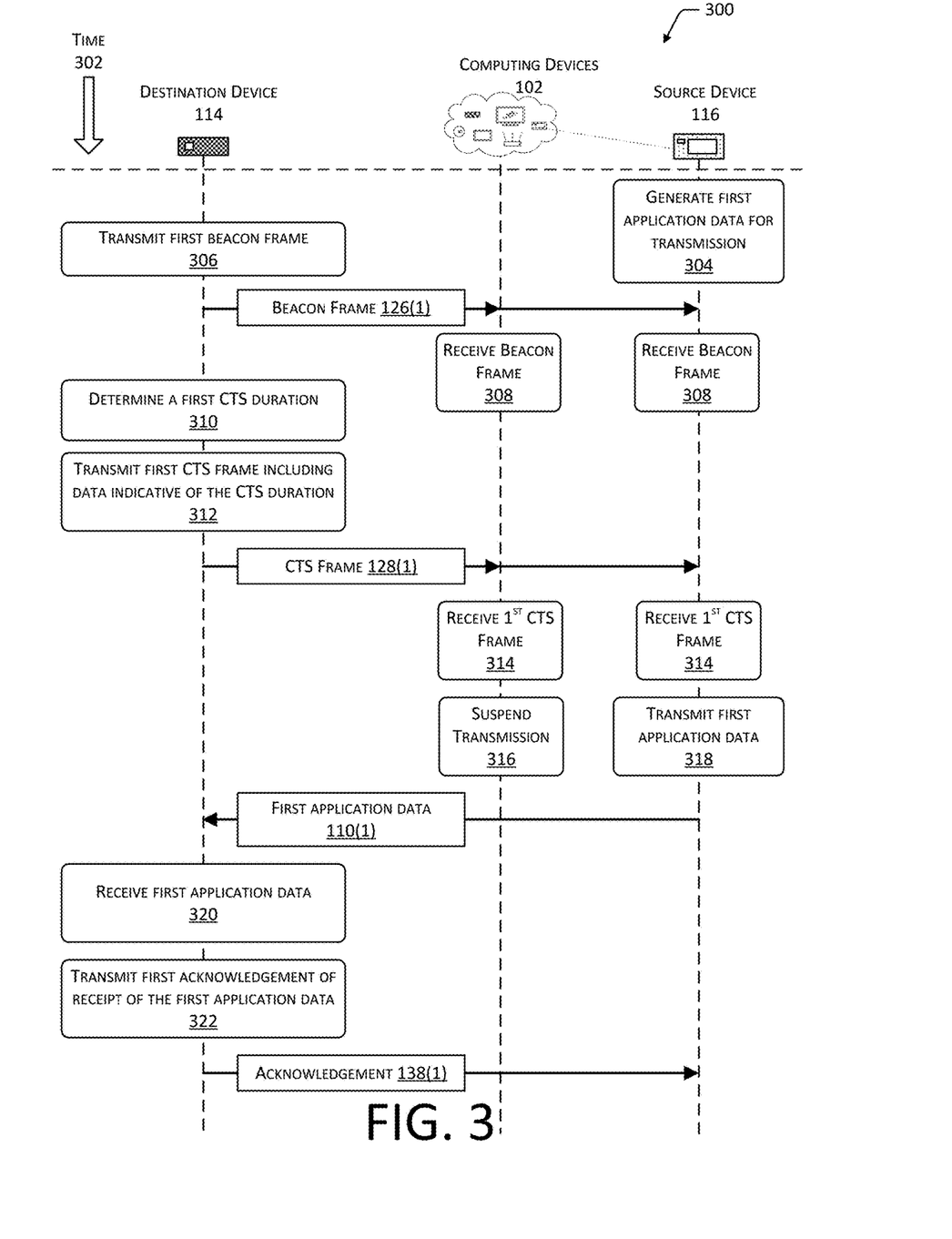
FIGS. 3-4 illustrate a flow diagram of a process to transfer application data from a source device to a destination device, according to one implementation.
Figure 4:
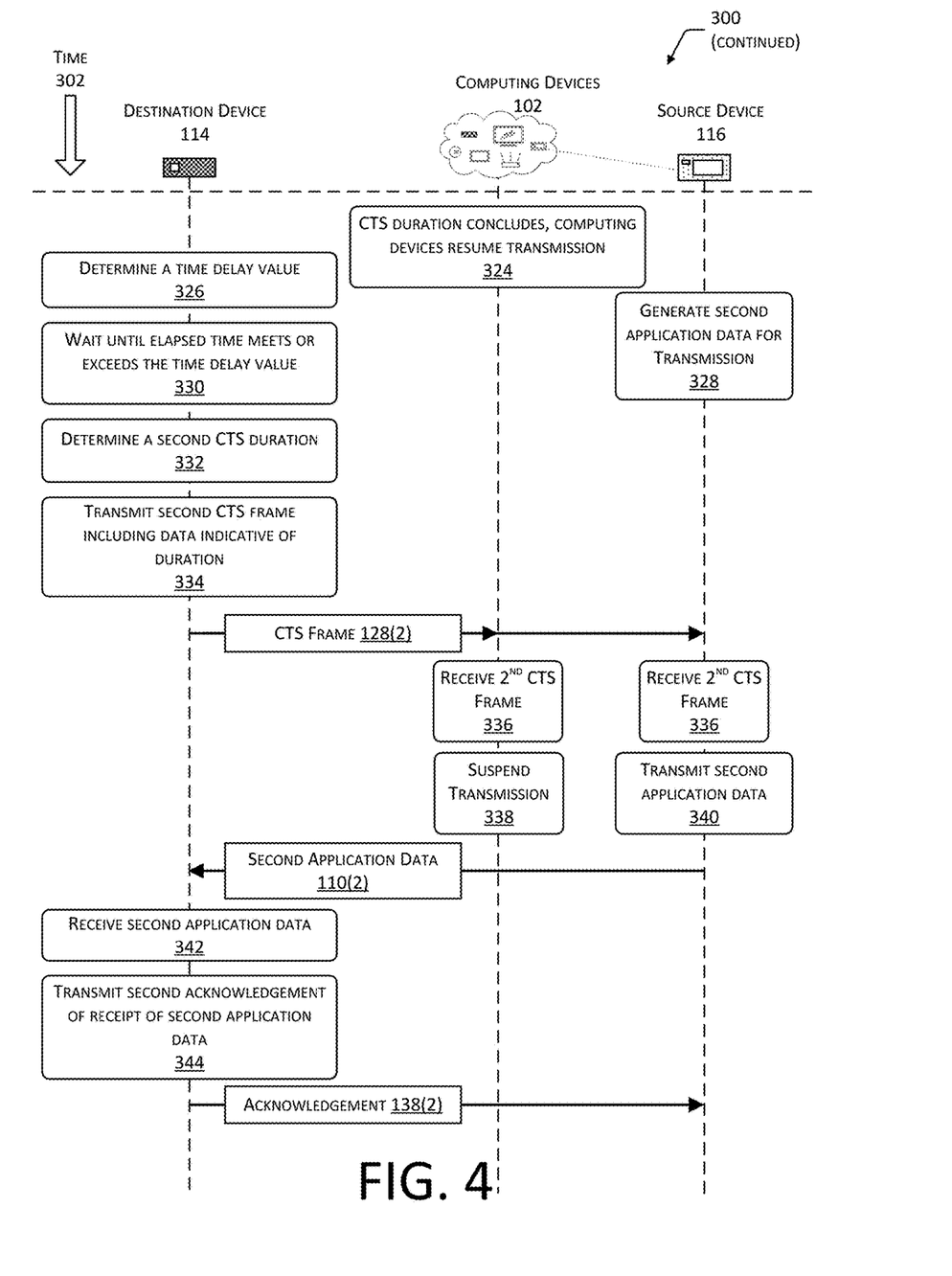

FIGS. 3-4 illustrate a flow diagram 300 of a process to transfer data such as application data 110 from a source device 116 to a destination device 114, according to one implementation. In these figures, time 302 increases down the page.

At 304, a source device 116 generates first application data 110 for transmission. For example, when the source device 116 comprise a remote control the first application data 110 may comprise data indicative of keys depressed by the user.

At 306, the destination device 114 transmits a first beacon frame 126. This first beacon frame 126 is broadcast on to the wireless network 104. As described above, beacon frames 126 may be transmitted at a beacon interval or upon demand.

At 308 the computing devices 102 receive the beacon frames 126 using their wireless network interfaces 118. For example, the source device 116 may receive the beacon frame 308.

In one implementation the destination device 114 and the source device 116 may have a pre-existing data connection established. In another implementation, the destination device 114 and the source device 116 may not establish a data connection until after receipt of the beacon frame 126, the CTS frame 128, and so forth. For example, the source device 116 may establish an encrypted transmission control protocol session after receipt of the beacon frame 126, the CTS frame 128, and a determination that there is application data 110 queued up for transmission.

At 310 the destination device 114 determines a first CTS duration 130. For example, the CTS duration 130 may be based on one or more of the application module 124, the application data 110, the network metric data 136, and so forth. This is discussed in more detail below with regard to FIGS. 4-7. In another example, the first CTS duration 130 may be predetermined, such as a value specified by a developer, system administrator, and so forth.

At 312 the destination device 114 transmits a first CTS frame 128. The first CTS frame 128 includes the first CTS duration 130. In some implementations transmission of CTS frames 128 may be configured to occur after the transmission of the beacon frame 126.

At 314 the computing devices 102 receive the first CTS frame 128. For example, the source device 116 may receive the CTS frame 128.

At 316 other computing devices 102, responsive to the first CTS frame 128, suspend transmission for the period of time based on the CTS duration 130. This creates a "quiet period" of reduced activity on the wireless network 104.

At 318, the source device 116 transmits the first application data 110 to the destination device 114. The transmission may be responsive at least in part to the reception of the first CTS frame 128. The transmission of the application data 110 may begin during the time interval specified by the CTS duration 130. For example, the source device 116 may start transmitting during the "quiet period", but the time to transmit the application data 110 may extend beyond the end of the quiet period. In another implementation, the transmission of the application data 110 may be responsive to reception of both the beacon frame 126 and the CTS frame 128. However, the CTS frame 128 described in this system is transmitted without prior receipt of, and thus is not responsive to, a request to send (RTS) frame. Instead, the CTS frame 128 is transmitted at one or more times as described in this disclosure.

The source device 116 is described above may use one or more techniques to determine whether to suspend transmission during the CTS duration 130 whether to transmit the application data 110. For example, the pairing data 122 may include information indicative of the MAC address of the destination device 114. After receiving the CTS frame 128, the source device 116 a compare the received MAC address from the CTS frame 128 with the previously stored MAC address indicated in the pairing data 122. Continuing the example, when the two MAC addresses match the source device 116 transmits the first application data 110. In the event there is not a match, source device 116 would otherwise honor the CTS frame 128 and suspend transmission during the specified CTS duration 130.

At 320 the destination device 114 receives the first application data 110.

At 322, the destination device 114 transmits a first acknowledgment 138 of receipt of the first application data 110 to the source device 116. In some implementations the wireless network interface 118 may generate and transmit the acknowledgment 138 without intervention of the application module 124. For example, a processor of the wireless network interface 118 and instructions executing on the processor may generate the acknowledgment 138 and initiate transmission automatically. Using this implementation, the acknowledgment 138 may be sent with very low latency with respect to reception of the application data 110. For example, the acknowledgment 138 may be generated and transmitted in less than 100 microseconds. This low latency improves responsiveness to the source device 116 and also may allow the acknowledgment 138 to start being transmitted during the quiet period initiated by the first CTS frame 128.

At 324 the CTS duration 130 concludes, the computing devices 102 may resume normal transmission on the channel of the wireless network 104.

At 326 the destination device 114 may determine a time delay value 134. The time delay value 134 may be based on one or more of a previously defined value based associated with the first application data 110, network metric data 136 indicative of congestion on a communication channel, a predicted time of receipt of subsequent application data 110 from the second device, type of application that is communicating, and so forth.

In one implementation, the time delay value 134 may be based on the prediction of when subsequent application data 110 will be queued up and ready for transmission by the source device 116. For example with the source device 116 comprises a remote control and the application data 110 is representative of user inputs, timestamps may be obtained for each of the individual user input events application data 110 comprising many events. This data may be analyzed to determine when the user may not be expected to provide input. Continuing the example, the user may be playing an interactive video game in which there are particular portions that involve high levels of user interaction such as fast gameplay, followed by pauses or interludes in which the user may be watching a cinematic sequence. By analyzing previously received application data 110, a prediction may be made as to when additional inputs are expected. Based on this prediction, the time delay value 134 may be calculated. Returning to the example, the prediction may be that the user is expected to provide additional application data 110 in 270 ms. The time delay value 134 may then be set to 270 ms.

In another implementation, a particular application module 124 or application data 110 be associated with a particular time delay value 134. For example, the time delay value 134 associated with particular application module 124 may be stored in a lookup table or other data structure may be subsequently retrieved.

At 328 the source device 116 generates second application data 110 for transmission. For example, the user may have provided input to the remote control that results in application data 110 indicative of that input.

At 330 the destination device 114 waits until an elapsed time meets or exceeds the time delay value 134. The elapsed time may be measured with respect to one or more events, such as transmission of the CTS frame 128, reception of application data 110, transmission of acknowledgment 138, and so forth. This weight introduced by the time delay value 134 provides an opportunity during which devices on the wireless network 104 may communicate without intervention by CTS frames 128.

At 332, a second CTS duration 130 is determined. Due to changing conditions, such as changes to the wireless network 104 indicated by the network metric data 136, the CTS duration 130 may in some implementations change over time.

At 334, responsive to the elapsed time meeting or exceeding the time delay value 134, the destination device 114 transmits the second CTS frame 128. As described above, the weight produced by the time delay value 134 provides an opportunity during which the computing devices 100 to may communicate with one another on the wireless network 104 unfettered by CTS frames 128 sent by the destination device 114.

At 336 the second CTS frame 128 is received by the computing devices 102, including the source device 116.

At 338, the computing devices 102 other than the source device 116 suspend transmission during the CTS duration 130 specified by the CTS frame 128.

At 340 the source device 116 transmits the second application data 110 during the "quiet period" that results from the other computing devices 102 honoring the second CTS frame 128. The transmission of the application data 110 may begin during the time interval specified by the CTS duration 130, but may not necessarily conclude during the quiet period. The transmission may be responsive at least in part to the reception of the second CTS frame 128. In one implementation, the transmission of the application data 110 may be responsive to reception of the beacon frame 126 and the CTS frame 128.

At 342 the destination device 114 receives the second application data 110.

At 344 the destination device 114 may transmit a second acknowledgment 138 of receipt of the second application data 110. For example, the second acknowledgment 138 may be sent using the wireless network interface 118.

In some implementations, the source device 116 may also transmit to the wireless network 104 data indicative of cancellation of the CTS frame 128. For example, after receiving the acknowledgment 138, the source device 116 may determine that there is no further application data 110 ready for transmission and we subsequently transmit a CTS cancellation frame. The computing devices 102 on the wireless network 104 may honor the CTS cancellation frame by resuming transmission as they normally would.

The source device 116 may have its wireless network interface 118 configured to use a modulation and coding scheme (MCS) that reduces transmission time of the application data 110. For example, the application data 110 may be a relatively small amount of data, such as a few hundred bytes. An MCS may be selected for transmission that will transfer that application data 110 with the minimum amount transmission time.

For example, the wireless network interface 118 of the source device 116 may be configured to use a MCS for data transmission that transmits an individual frame of the first application data 110 within a maximum data transmission time. The wireless network interface 118 may then transmit the individual frame of the first application data 110 within the maximum data transmission time. The maximum data transmission time may be less than or equal to the interval of time continuing until the end of the period of time specified by the first CTS duration 130.

Unlike conventional systems that may utilize a combination of RTS frames and CTS frames 128, the system as described in this disclosure offers several advantages. For example, overall network utilization is minimized as a result of omission of the RTS frames. In another example, the destination device 114 is able to instigate the transmission of the application data 110, if any is available.

Figure 5:
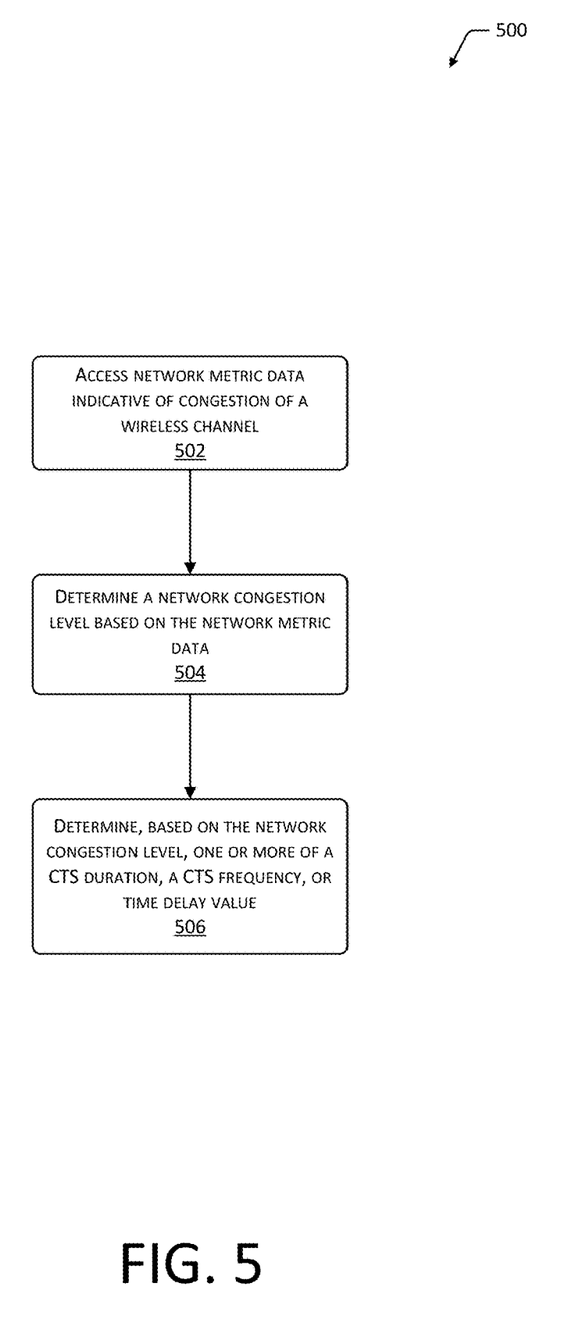
FIG. 5 illustrates a flow diagram of a process to determine a CTS interval based on network metric data indicative of network congestion, according to one implementation.

FIG. 5 illustrates a flow diagram 500 of a process to determine a CTS interval based on network metric data 136 indicative of network congestion, according to one implementation. The process may be performed at least in part by one or more of the computing devices 102.

At 502 network metric data 136 is accessed. The network metric data 136 may be generated by one or more of the wireless network interface 118, the communication module 120, the application module 124, and so forth. In some implementations, the network metric data 136 may be received from another computing device 102.

At 504 at least a portion of the network metric data 136 may be compared to the threshold values or otherwise processed. In one implementation, the network metric data 136 may be used to determine a network congestion level. For example, the network metric data 136 may provide information such as clear channel assessment (CCA) data generated by the wireless network interface 118. Based on this CCA data, data indicative of congestion of the wireless channel be determined. For example, the congestion may be indicated as a percentage of time that the channel is in use or as a percentage of time channel is not in use.

At 506 one or more of the CTS duration 130, the CTS frequency data 132, or time delay value 134 is determined based at least in part on the network metric data 136. For example, when the network congestion is above a threshold level, the CTS frequency may be increased while the CTS duration 130 may be decreased. A lookup table or other data structure may be used to associate particular values of CTS duration 130, CTS frequency data 132, time delay values 134, and so forth with particular levels of network congestion, predicted time of receipt of subsequent application data 110 from the source device 116, and so forth. For example, if the network metric data 136 indicates network congestion is above a network congestion threshold of 70%, the time delay value 134 may be 100 microseconds. In another example, if the type of application module 124 is an interactive video game, the time delay value 134 specified by the lookup table may be set to 5000 microseconds.

Figure 6:
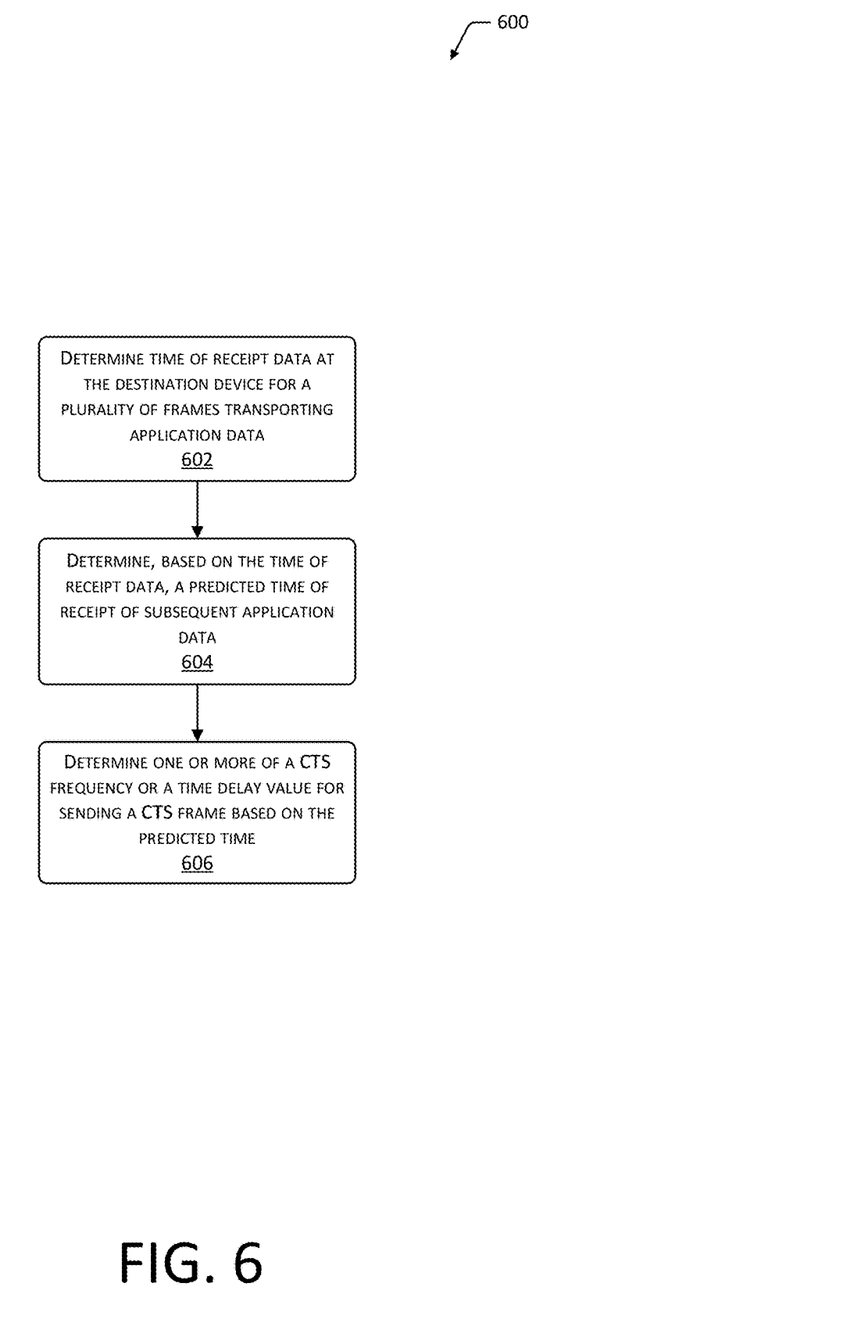
FIG. 6 illustrates a flow diagram of a process to determine a CTS interval based on network metric data indicative of when application data is received at the destination device, according to one implementation.

FIG. 6 illustrates a flow diagram 600 of a process to determine a CTS interval based on network metric data 136 indicative of when application data 110 is received at the destination device 114, according to one implementation. The process may be performed at least in part by one or more of the computing devices 102.

At 602 time of receipt data is determined for a plurality of frames transporting the application data 110. In some implementations time of receipt data may be indicative of particular frames, or may be indicative of information inside of those frames. For example, time of receipt data may be timestamps associated with individual key presses as determined by the source device 116 that generates the application data 110.

At 604, based on the time of receipt data, a predicted time of receipt of subsequent application data frames. The predicted time may be calculated using one or more techniques. For example, an average time between application data frames may be determined and used as the predicted time. In another example, a statistical analysis may be used to generate the predicted time.

At 606 one or more of the CTS frequency data 132 or the time delay value 134 may be determined based at least in part of a predicted time. For example, the time delay value 134 may be set to the predicted time. The destination device 114 may then transmit the CTS frame 128 at or before the predicted time of receipt of the application data 110. In this way, the destination device 114 may prospectively poll and provide a quiet time for the source device 116 to send application data 110, if any.

This process allows for the transmission of the CTS frames 128 to dynamically respond to changes in the system 100. As a result, overall performance that involves the interaction between the source device 116 and the destination device 114 may be improved.

Figure 7:
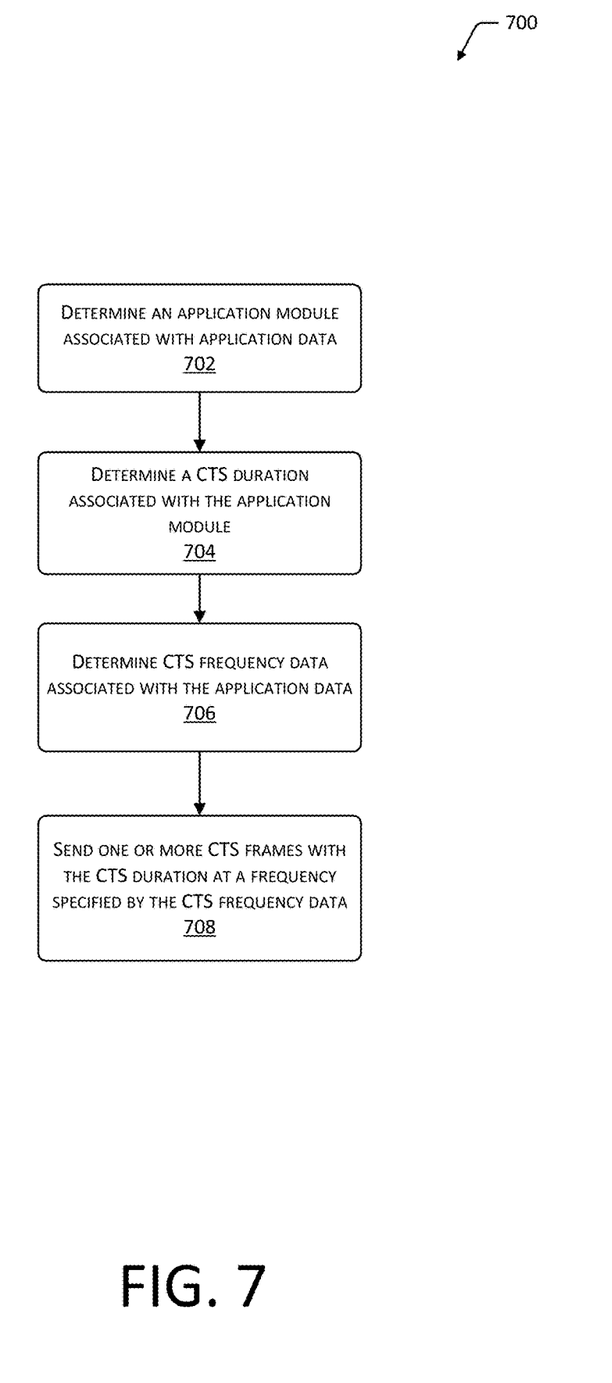
FIG. 7 illustrates a flow diagram of a process to determine a CTS interval based on application data, according to one implementation.

FIG. 7 illustrates a flow diagram 700 of a process to determine a CTS interval based on application data 110, according to one implementation. The process may be performed at least in part by one or more of the computing devices 102.

At 702 an application module 124 executing on the destination device 114 that is associated with the application data 110 is determined. For example, the application module 124 may comprise a content presentation application to render video for display. The application data 110 may comprise information indicative of user inputs to control presentation of the content, such as content selection options, play, policy, forward fast, rewind, and so forth. For example, application data 110 may be associated with a particular application module 124 based on header information within the application data 110, a network address report used to transmit the application data 110, and so forth.

In some implementations the type of application module 124 associated with the application data 110 may be determined. For example, the types of application modules 124 may include but are not limited to, realtime communications applications, interactive video games, content presentation, word processing, web browsing, and so forth.

At 704 a CTS duration 130 is determined based at least in part on the application module 124 or type of application module 124. For example, a lookup table or other data structure may associate particular application modules 124, particular types of application data 110, and so forth with particular CTS durations 130. Continuing the example, where the application module 124 comprises an interactive video game, the CTS duration 130 may be 20 ms, a time interval selected to allow sufficient time for user inputs to be transmitted without undue delay.

At 706 CTS frequency data 132 indicative of a time to transmit another CTS frame 128 is determined. For example, a lookup table or other data structure may associate particular application modules 124, particular kinds of application data 110, and so forth with particular CTS frequency data 132. Continuing the example of the interactive videogame, the CTS frequency data 132 may specify that CTS frames 128 are to be sent every 33.33 ms. The CTS frequency data 132 may be expressed as a fractional value of another interval value. For example the CTS frequency data 132 may indicate that the CTS frame 128 is to be transmitted in interval that is one quarter that of the beacon rate.

At 708, at a time specified by the CTS frequency data 132, another CTS frame 128 may be transmitted. As a result, the destination device 114 may regularly transmit CTS frames 128 to facilitate transmission of application data 110 by the source device 116 to the destination device 114.

Figure 8:
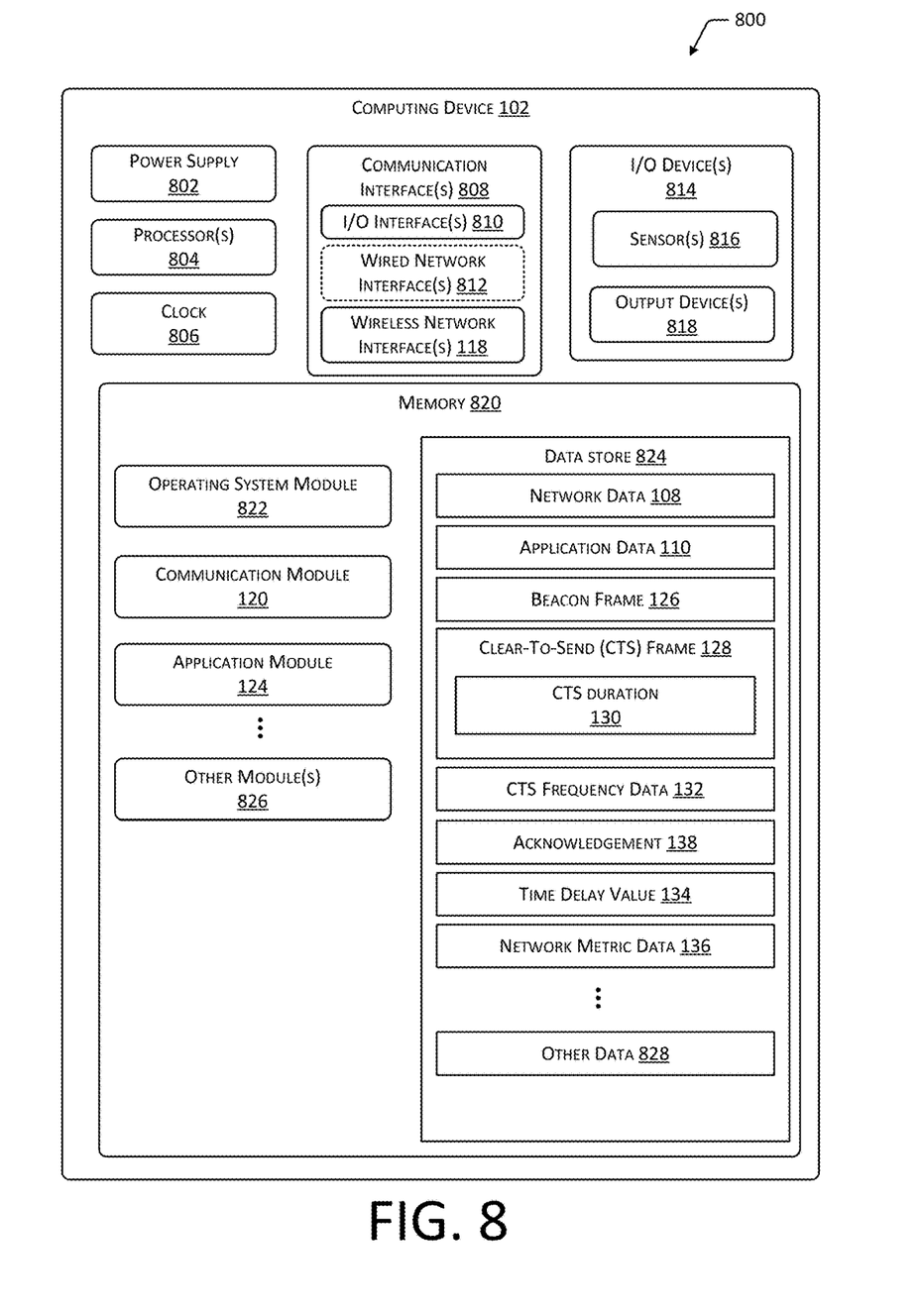
FIG. 8 illustrates a block diagram of the computing device, according to one implementation.

FIG. 8 illustrates a block diagram 800 of the computing device 102, according to one implementation. One or more power supplies 802 are configured to provide electrical power suitable for operating the components in the computing device 102. In some implementations, the power supply 802 may include line power, a single use battery, a rechargeable battery, a fuel cell, a photovoltaic cell, a wireless power receiver, a thermoelectric generator, and so forth.

The computing device 102 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to generate a timestamp, trigger a preprogrammed action, and so forth. In some implementations, one or more of the components described with regard to the computing device 102 may be implemented by one or more of an application specific integrated circuit (ASIC), system-on-a-chip (SOC), a microcontroller, and so forth.

The computing device 102 may include one or more communication interfaces 808 such as I/O interfaces 810, wired network interfaces 812, wireless network interfaces 118, and so forth. The communication interfaces 808 enable the computing device 102, or components thereof, to communicate with other devices or components. The communication interfaces 808 may include one or more I/O interfaces 810. The I/O interfaces 810 may comprise interfaces such as Inter-Integrated Circuit (I2C), Serial Peripheral Interface bus (SPI), Universal Serial Bus (USB), RS-232 interface, Peripheral Component Interconnect Express (PCIe), Secure Digital Input Output (SDIO), and so forth.

The I/O interface(s) 810 may couple to one or more I/O devices 814. The I/O devices 814 may include input devices such as one or more sensors 816. The sensors 816 may include the touch sensor, buttons, proximity sensors, switches, and so forth. The I/O devices 814 may also include output devices 818. For example, the output devices 818 may include one or more of a light emitting diode display, a liquid crystal display, an electrophoretic display, coaster display, a speaker, a haptic output device, and so forth. In some embodiments, the I/O devices 814 may be physically incorporated with the computing device 102 or may be externally placed.

The network interfaces 812 and 118 are configured to provide communications between the computing device 102 and other devices, such as routers, access points, other computing devices 102, and so forth. The network interfaces may include devices configured to couple to personal area networks (PANs), local area networks (LANs), wide area networks (WANs), and so forth. The wireless network interface 118 may comprise one or more components such as radio receivers, radio transmitters, and so forth. The wireless network interface 118 may include devices compatible with Wi-Fi, Bluetooth, ZigBee, 3G, 4G, LTE, and so forth. In comparison, the wired network interface 812 may include devices compatible with Ethernet.

The computing device 102 may also include one or more busses or other internal communications hardware or software that allow for the transfer of data between the various modules and components of the computing device 102.

As shown in FIG. 8, the computing device 102 includes one or more memories 820. The memory 820 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 102. A few example functional modules are shown stored in the memory 820, although the same functionality may alternatively be implemented in hardware, firmware, or as a system on a chip (SOC).

The memory 820 may include at least one operating system OS module 822. The OS module 822 is configured to manage hardware resource devices such as the I/O interfaces 810, the wireless network interface 118, the wired network interface 812, the I/O devices 814, and provide various services to applications or modules executing on the processors 804. The OS module 822 may implement a variant of the FreeBSD operating system as promulgated by the FreeBSD Project, other UNIX or UNIX-like variants, a variation of the Linux operating system as promulgated by Linus Torvalds, the Windows operating system from Microsoft Corporation of Redmond, Wash., or other operating system.

Also stored in the memory 820 may be a data store 824 and one or more of a communication module 120, application module 124, or other module(s) 826. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices 102, network attached storage devices, and so forth.

The data store 824 may include one or more of the network data 108, application data 110, data associated with the beacon frame 126, beacon interval data, data associated with the CTS frame 128, CTS duration 130, CTS frequency data 132, data associated with the acknowledgment 138, the time delay value 134, network metric data 136, or other data 828.

The communication module 120 may be configured to establish connections with one or more of the computing devices 102. The communications may be authenticated, encrypted, and so forth.

The application module 124 the described above may perform one or more functions generating, processing, storing, or otherwise manipulating application data 110. For example, the application module 124 may comprise a remote control application, a media player application, a web browser, and so forth.

The other modules 826 may also be present in the memory 820, as well as other data 828 in the data store 824.

The techniques described in this disclosure may be implemented by one or more of the communication interfaces 808, the OS module 822, the communication module 120, the application module 124, and so forth.

The techniques described in this disclosure may improve connectivity between devices that use wireless network interfaces 118 as part of a wireless network 104. By using the CTS frame 128 transmitted by the destination device 114, the particular scheduling of the CTS frame transmission, and having the source device 116 be response to one or more of the beacon frame 126 or the CTS frame 128, the system allows for timely transmission in a congested network environment.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Likewise, a particular type of mathematical operation such as addition, subtraction, multiplication, division, and so forth may be replaced with a counterpart. For example, addition may be replaced by subtraction where the signs of the values operated on are changed.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   determining, based on information obtained by a destination device, a value of an adjustable parameter associated with transmission of clear to send (CTS) frames;
   without previously receiving a request to send (RTS) frame, transmitting from the destination device a first set of the one or more CTS frames at a first time according to the value of the adjustable parameter using a wireless network, wherein the one or more of the CTS frames include a CTS duration; and receiving at the destination device, during an interval of time specified by the CTS duration, at least a portion of application data transmitted by a source device using the wireless network.

2. The method of claim 1, further comprising:
transmitting from the destination device one or more beacon frames, wherein the beacon frames include a destination address designating a broadcast; and
wherein the one or more CTS frames are transmitted according to the value of the adjustable parameter after the transmitting of the one or more beacon frames.

3. The method of claim 1, further comprising:
determining time of receipt data for a plurality of frames transporting the application data;
determining, based on the time of receipt data, a predicted time of receipt of subsequent application data frames; and
transmitting from the destination device the one or more CTS frames at or before the predicted time of receipt according to the value of the adjustable parameter.

4. The method of claim 1, further comprising:
determining a time delay value based on the value of the adjustable parameter;
determining an elapsed time since one or more of receipt of the application data or transmission to the source device of an acknowledgement of receipt of the application data;
determining the elapsed time meets or exceeds the time delay value; and
transmitting a second set of one or more CTS frames at a second time after the elapsed time.

5. The method of claim 4, further comprising:
determining a first CTS interval of time as specified by the CTS duration; and
wherein the second time is after the first CTS interval.

6. The method of claim 4, wherein the determining the time delay value based on the value of the adjustable parameter comprising one or more of:
accessing a previously defined time delay value associated with the application data;
accessing a previously defined time delay value associated with a type of application associated with the application data;
determining congestion on a communication channel exceeds a threshold level based on network metric data; or
determining a predicted time of receipt of subsequent application data from the source device based on the application data as previously received.

7. The method of claim 1, further comprising:
determining network metric data indicative of a quantity of traffic transmitted on the wireless network; and
wherein the CTS duration is based at least in part on the network metric data.

8. The method of claim 1, wherein the application data is received at the destination device using a modulation and coding scheme for data transmission that provides for transmission of an individual frame of the first application data within a maximum data transmission time, and further wherein the maximum data transmission time is less than or equal to the interval of time specified by the CTS duration.

9. A device comprising:
a first memory storing computer-executable instructions; and
a first processor to execute the computer executable instructions to:
transmit a first beacon frame;
determine, based on information obtained by the first processor, a value of an adjustable parameter associated with clear to send (CTS) frame transmission;
transmit, without responding to a request to send (RTS) frame, a first CTS frame at a first time according to the value of the adjustable parameter, wherein the first CTS frame includes data indicative of a first CTS duration; and
receive, during an interval of time starting at the first time and continuing until an end of a period of time specified by the first CTS duration, at least a portion of first application data from a second device.

10. The device of claim 9, further comprising a first wireless network interface including a second processor to execute computer executable instructions to:
generate, using the wireless network interface, an acknowledgement indicative of receipt of the first application data; and
transmit, using the wireless network interface, the acknowledgement to the second device.

11. The device of claim 9, wherein:
the first beacon frame is transmitted using a first modulation and a first coding scheme; and
the first application data is received within the interval of time using a second modulation and a second coding scheme.

12. The device of claim 9, the first processor further to execute computer-executable instructions to:
transmit, without responding to a request to transmit (RTS) frame, a second CTS frame at a second time according to the value of the adjustable parameter, wherein the second CTS frame includes data indicative of a second CTS duration; and
receive, during a second interval of time starting at the second time and continuing until an end of a period of time specified by the second CTS duration, at least a portion of second application data from the second device.

13. The device of claim 9, the first processor further to execute computer-executable instructions to:
determine a time delay value indicative of a minimum time to wait before transmitting a subsequent CTS frame based on the value of the adjustable parameter;
determine an elapsed time since one or more of receipt of the first application data or transmission of an acknowledgement to the second device;
determine the elapsed time meets or exceeds the time delay value; and
transmit a second CTS frame at a second time after the elapsed time.

14. The device of claim 13, the first processor further to execute computer-executable instructions to:
determine a first CTS interval of time as specified by the first CTS duration; and
wherein the second time is after the first CTS interval.

15. The device of claim 13, wherein the value of the adjustable parameter is a defined value associated with the first application data, the first processor further to execute computer-executable instructions to determine the time delay value based at least in part on the previously defined value associated with the first application data.

16. The device of claim 13, wherein the value of the adjustable parameter is network metric data indicative of congestion on a wireless network, the first processor further to execute computer-executable instructions to determine the time delay value based at least in part on the network metric data indicative of congestion on the wireless network.

17. The device of claim 13, wherein the value of the adjustable parameter is a predicted time of receipt of subsequent application data from the second device, the first processor further to execute computer-executable instructions to determine the time delay value based at least in part on the predicted time of receipt of the subsequent application data from the second device.

18. The device of claim 9, the first processor further to execute computer-executable instructions to:
 determine network metric data indicative of a quantity of traffic transmitted on a wireless network; and
 determine the first CTS duration based at least in part on the network metric data.

19. A first device comprising:
 a wireless network interface comprising a radio to send and receive signals on a channel;
 a first memory storing computer-executable instructions; and
 a first processor to execute the computer executable instructions to:
  transmit, using the wireless network interface, a first beacon frame on the channel, wherein the first beacon frame includes:
   data indicative of a timestamp;
   data indicative of a first media access control (MAC) address associated with the wireless network interface; and
   data indicative of a service set identification (SSID);
  access a first clear to send (CTS) duration indicative of an interval of time in microseconds during which transmission on the channel by a device honoring a CTS frame including the first CTS duration is to cease;
  determine a value of an adjustable parameter associated with CTS frame transmission;
  without previously receiving a request to transmit (RTS) frame, transmit a first CTS frame at a first time according to the value of the adjustable parameter using the wireless network interface, wherein the first CTS frame includes data indicative of the first CTS duration in microseconds; and
  receive, using the wireless network interface, at least a portion of first application data from a second device at a second time that is within the first CTS duration.

20. The first device of claim 19, the first processor to further execute the computer-executable instructions to:
 determine a type of application module executing on the first device that is associated with the first application data;
 wherein the access to the first CTS duration is based on an association between the type of application to a particular CTS duration;
 determine CTS frequency data indicative of how often per unit of time to transmit subsequent CTS frames based on the value of the adjustable parameter; and
 send, at intervals specified by the CTS frequency data, the subsequent CTS frames.

* * * * *